US011412092B2

(12) United States Patent
Cheng et al.

(10) Patent No.: US 11,412,092 B2
(45) Date of Patent: Aug. 9, 2022

(54) USER EQUIPMENT POLICY MANAGEMENT IN EVOLVED PACKET SYSTEMS AND FIFTH GENERATION SYSTEMS INTERWORKING

(71) Applicant: QUALCOMM Incorporated, San Diego, CA (US)

(72) Inventors: Hong Cheng, Bridgewater, NJ (US); Haris Zisimopoulos, London (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/909,417

(22) Filed: Jun. 23, 2020

(65) Prior Publication Data

US 2020/0404107 A1 Dec. 24, 2020

(30) Foreign Application Priority Data

Jun. 24, 2019 (GR) ............................... 20190100274

(51) Int. Cl.
| | | |
|---|---|---|
| *H04M 15/00* | (2006.01) | |
| *H04L 12/14* | (2006.01) | |
| *H04W 8/08* | (2009.01) | |
| *H04W 76/12* | (2018.01) | |
| *H04W 88/16* | (2009.01) | |
| *H04W 48/16* | (2009.01) | |

(52) U.S. Cl.
CPC ........ *H04M 15/66* (2013.01); *H04L 12/1407* (2013.01); *H04W 8/08* (2013.01); *H04W 48/16* (2013.01); *H04W 76/12* (2018.02); *H04W 88/16* (2013.01)

(58) Field of Classification Search
None
See application file for complete search history.

(56) References Cited

U.S. PATENT DOCUMENTS

| | | | |
|---|---|---|---|
| 2010/0210288 A1* | 8/2010 | Kim ...................... | H04W 68/02 455/458 |
| 2011/0249654 A1* | 10/2011 | Yu .......................... | H04W 60/04 370/331 |
| 2019/0037516 A1* | 1/2019 | Kim .................... | H04W 60/005 |

(Continued)

FOREIGN PATENT DOCUMENTS

| | | |
|---|---|---|
| EP | 3694289 A1 | 8/2020 |
| WO | 2019073977 A1 | 4/2019 |

OTHER PUBLICATIONS

S2-180981—SA WG2 Meeting #125, Jan. 22-26, 2018, Gothenburg, Sweden (Year: 2018).*

(Continued)

*Primary Examiner* — German Viana Di Prisco
(74) *Attorney, Agent, or Firm* — Patterson & Sheridan, L.L.P.

(57) ABSTRACT

Certain aspects of the present disclosure provide techniques for user equipment (UE) policy management in interworking evolved packet systems (EPS) and fifth generation (5G) wireless communications systems. In an exemplary method, a UE may transmit, to a mobility management entity (MME), a request for a UE policy from a policy control function (PCF) and receive the UE policy from the MME.

28 Claims, 12 Drawing Sheets

(56) References Cited

U.S. PATENT DOCUMENTS

| | | | |
|---|---|---|---|
| 2019/0098502 A1* | 3/2019 | Torvinen | H04L 9/083 |
| 2019/0313236 A1* | 10/2019 | Lee | H04W 48/18 |
| 2020/0112841 A1* | 4/2020 | Kim | H04W 4/06 |
| 2020/0196130 A1* | 6/2020 | Tamura | H04W 8/02 |
| 2020/0245283 A1* | 7/2020 | Cakulev | H04B 7/0413 |
| 2020/0259960 A1* | 8/2020 | Salgueiro | H04W 80/08 |
| 2020/0359291 A1* | 11/2020 | Ramle | H04W 48/18 |
| 2021/0227598 A1* | 7/2021 | Xin | H04W 36/08 |

OTHER PUBLICATIONS

3GPP TS 23.502: "3rd Generation Partnership Project; Technical Specification Group Services and System Aspects; Procedures for the 5G System; Stage 2 (Release 16)", 3GPP Standard; Technical Specification; 3GPP TS 23.502, 3rd Generation Partnership Project (3GPP), Mobile Competence Centre; 650, Route Des Lucioles; F-06921 Sophia-Antipolis Cedex; France, vol. SA WG2, No. V16. 1.1, Jun. 11, 2019 (Jun. 11, 2019), pp. 1-495, XP051753974, [retrieved on Jun. 11, 2019] 4.11 System interworking procedures with EPC; p. 175-p. 224.
International Search Report and Written Opinion—PCT/US2020/039429—ISA/EPO—dated Sep. 21, 2020.

* cited by examiner

USER EQUIPMENT POLICY MANAGEMENT IN EVOLVED PACKET SYSTEMS AND FIFTH GENERATION SYSTEMS INTERWORKING

CROSS-REFERENCE TO RELATED APPLICATIONS

The present Application for Patent claims priority to and the benefit of Greek Application No. 20190100274, filed on Jun. 24, 2019, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for user equipment (UE) policy management in interworking evolved packet systems (EPS) and fifth generation (5G) wireless communications systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a mobility management entity (MME). The method generally includes receiving, from a user equipment (UE), a request for a UE policy from a policy control function (PCF), obtaining the UE policy from the PCF, and transmitting the UE policy to the UE.

Certain aspects provide a method for wireless communication by a user equipment (UE). The method generally includes transmitting, to a mobility management entity (MME), a request for a UE policy from a policy control function (PCF) and receiving the UE policy from the MME.

Certain aspects provide a method for wireless communication by a policy control function (PCF). The method generally includes receiving, from a mobility management entity (MME), a request for a user equipment (UE) policy for a UE, obtaining the UE policy from a unified data repository (UDR), and transmitting the UE policy to the MME.

Certain aspects provide an apparatus for wireless communication. The apparatus generally includes a memory; and a processor coupled with the memory, the memory and the processor configured to receive, from a user equipment (UE), a request for a UE policy from a policy control function (PCF), to obtain the UE policy from the PCF, and to transmit the UE policy to the UE.

Certain aspects provide an apparatus for wireless communication. The apparatus generally includes a memory; and a processor coupled with the memory, the memory and the processor configured to transmit, to a mobility management entity (MME), a request for a UE policy from a policy control function (PCF) and to receive the UE policy from the apparatus.

Certain aspects provide an apparatus for wireless communication. The apparatus generally includes a memory; and a processor coupled with the memory, the memory and the processor configured to receive, from a mobility management entity (MME), a request for a user equipment (UE)

policy for a UE, to obtain the UE policy from a unified data repository (UDR), and to transmit the UE policy to the MME.

Certain aspects provide an apparatus for wireless communication. The apparatus generally includes means for receiving, from a user equipment (UE), a request for a UE policy from a policy control function (PCF), means for obtaining the UE policy from the PCF, and means for transmitting the UE policy to the UE.

Certain aspects provide an apparatus for wireless communication. The apparatus generally includes means for transmitting, to a mobility management entity (MME), a request for a user equipment (UE) policy from a policy control function (PCF) and receiving the UE policy from the MME.

Certain aspects provide an apparatus for wireless communication. The apparatus generally includes means for receiving, from a mobility management entity (MME), a request for a user equipment (UE) policy for a UE, means for obtaining the UE policy from a unified data repository (UDR), and means for transmitting the UE policy to the MME.

Certain aspects provide a computer-readable medium for wireless communication by a mobility management entity (MME). The computer-readable medium includes instructions that, when executed by a processing system, cause the processing system to perform operations generally including receiving, from a user equipment (UE), a request for a UE policy from a policy control function (PCF), obtaining the UE policy from the PCF, and transmitting the UE policy to the UE.

Certain aspects provide a computer-readable medium for wireless communication by a user equipment (UE). The computer-readable medium includes instructions that, when executed by a processing system, cause the processing system to perform operations generally including transmitting, to a mobility management entity (MME), a request for a UE policy from a policy control function (PCF) and receiving the UE policy from the MME.

Certain aspects provide a computer-readable medium for wireless communication by a policy control function (PCF). The computer-readable medium includes instructions that, when executed by a processing system, cause the processing system to perform operations generally including receiving, from a mobility management entity (MME), a request for a user equipment (UE) policy for a UE, obtaining the UE policy from a unified data repository (UDR), and transmitting the UE policy to the MME.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
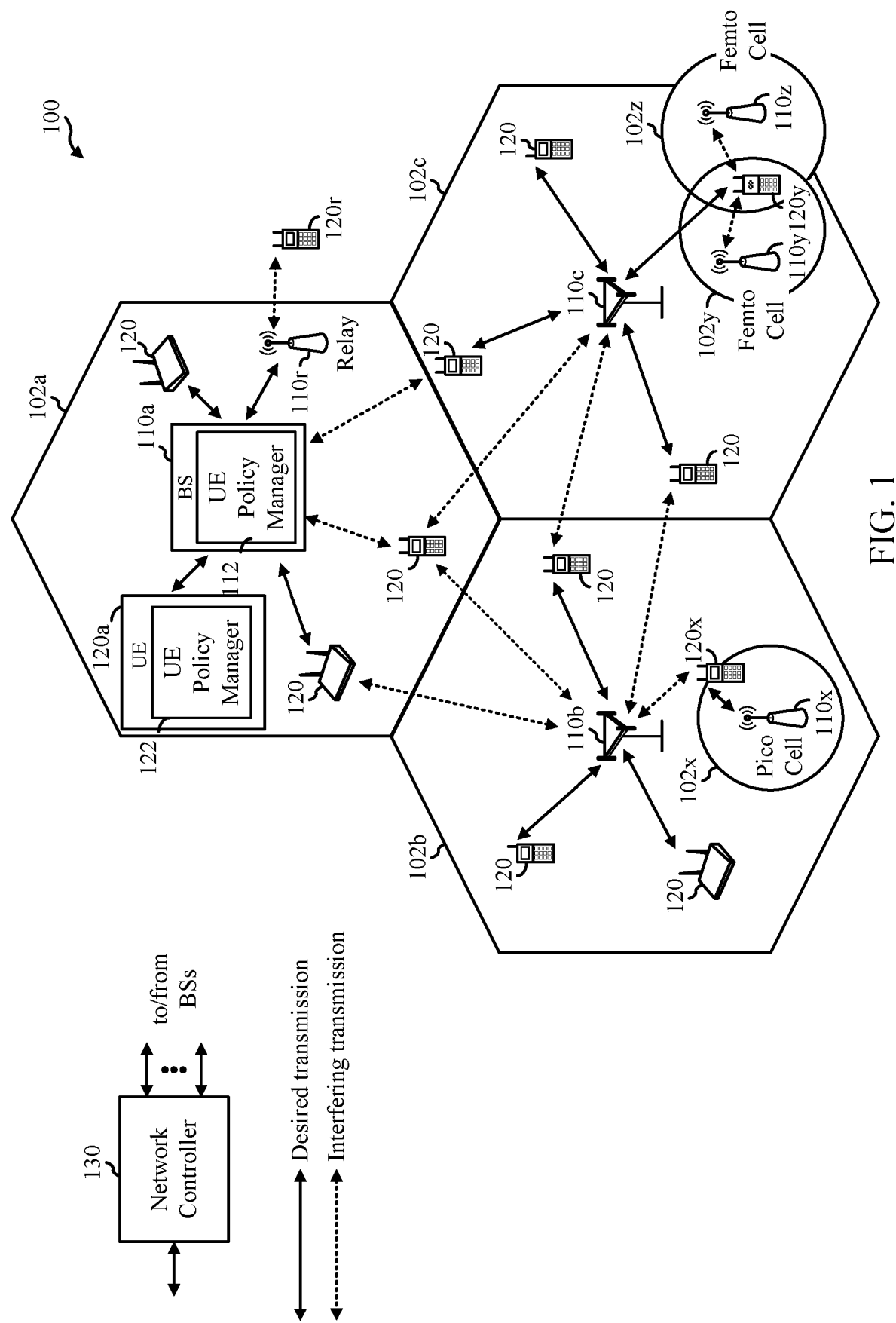
FIG. 1 is a block diagram conceptually illustrating an example telecommunications system, in accordance with certain aspects of the present disclosure.

Aspects of the present disclosure provide apparatus, methods, processing systems, and computer readable mediums for user equipment (UE) policy management in interworking evolved packet systems (EPS) and fifth generation (5G) wireless communications systems. The disclosed techniques may be useful provisioning UEs in networks deploying both EPS and 5G communications systems in an area. For example, in EPS networks, access network discovery and selection functions (ANDSF) are not typically deployed, and so there may not be a dynamic provisioning mechanism to allow network operators to configure a UE for connecting to the network when the UE is registered to the evolved packet core (EPC) and not the 5G core network. For initial 5G deployment (e.g., while network operators are still operating previous network technologies), the 5G core network (5GC) coverage may be limited (as non-standalone mode (NSA) still uses EPC). Therefore, UEs frequently do not have access to 5G provisioning mechanisms, i.e., via a policy control function (PCF). In addition, an operator that operates both EPS and 5GS may prefer to simplify policy management for UE, i.e., to avoid using both ANDSF and a separate PCF. Also, for EPS, the ANDSF rules have to be delivered over a user plane connection, either from the ANDSF via Open Mobile Alliance device management (OMA-DM) messages or a 3rd party server, which itself requires ANDSF rules to be properly setup. Therefore, it is desirable to develop a solution for UE Policy Control in EPS that does not require ANDSF.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120a has a UE Policy Manager module 122 (e.g., for management in EPS and 5GS interworking) that may be configured for transmitting, to a mobility management entity (MME), a request for a UE policy from a policy control function (PCF) and receiving the UE policy from the MME, according to aspects described herein. For example, as shown in FIG. 1, the BS 110a may have a UE Policy Manager module 112 (e.g., for management in EPS and 5GS interworking) in a mobility management entity (MME) that may be configured for receiving, from a user equipment (UE), a request for a UE policy from a policy control function (PCF), obtaining the UE policy from the PCF, and transmitting the UE policy to the UE, according to aspects described herein. For example, as shown in FIG. 1, the BS 110a may have a UE Policy Manager module 112 (e.g., for management in EPS and 5GS interworking) in a policy control function (PCF) that may be configured for receiving, from a mobility management entity (MME), a request for a user equipment (UE) policy for a UE, obtaining the UE policy from a unified data repository (UDR), and transmitting the UE policy to the MME, according to aspects described herein.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
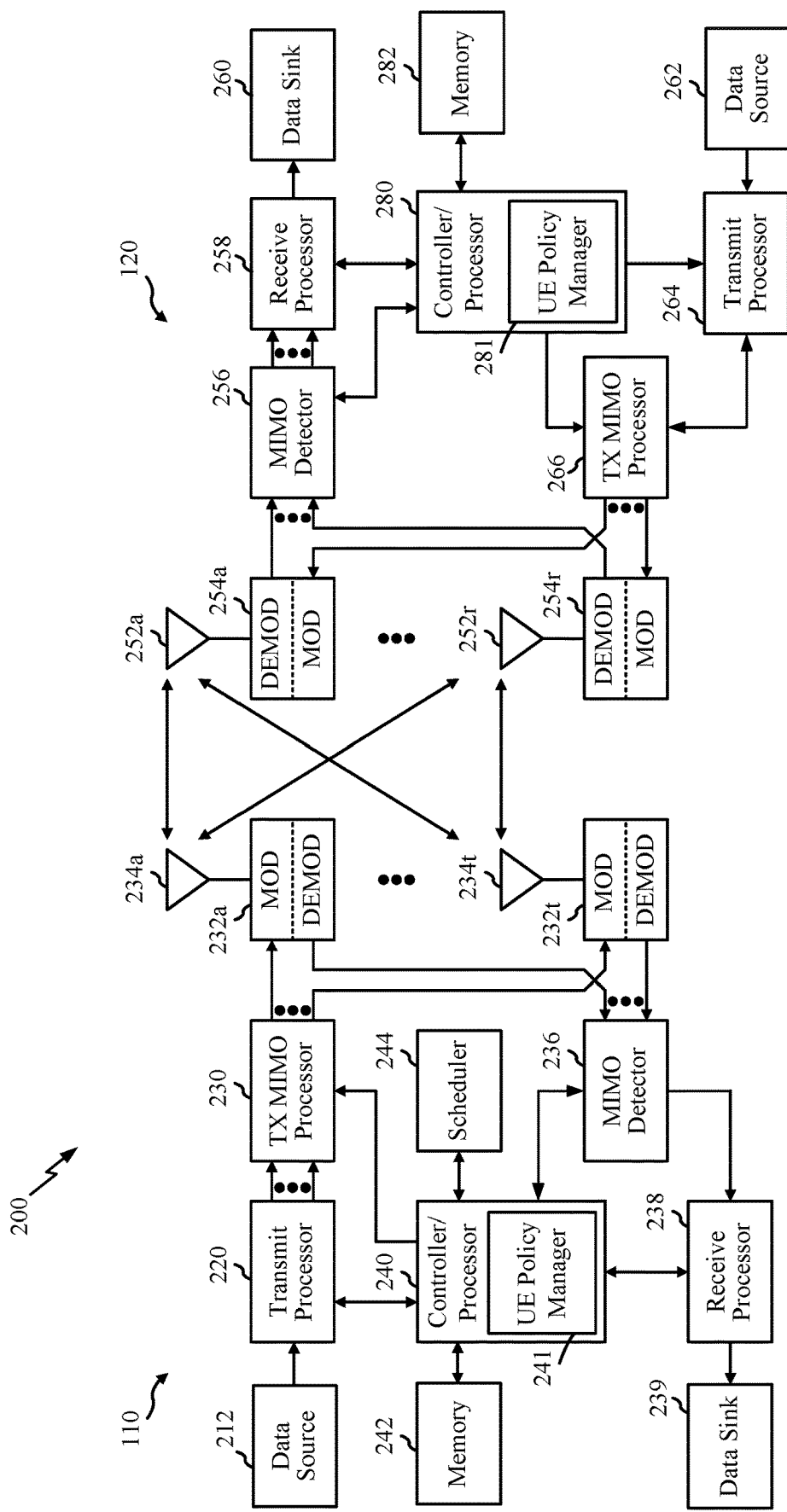
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a UE Policy Manager module 241 (e.g., for management in EPS and 5GS interworking) in a mobility management entity (MME) that may be configured for receiving, from a user equipment (UE), a request for a UE policy from a policy control function (PCF), obtaining the UE policy from the PCF, and transmitting the UE policy to the UE, according to aspects described herein. For example, as shown in FIG. 2, the controller/processor 240 of the BS 110 has a UE Policy Manager module 241 (e.g., for management in EPS and 5GS interworking) in a policy control function (PCF) that may be configured for receiving, from a mobility management entity (MME), a request for a user equipment (UE) policy for a UE, obtaining the UE policy from a unified data repository (UDR), and transmitting the UE policy to the MME, according to aspects described herein. For example, as shown in FIG. 2, the controller/processor 280 of the UE 120 has an UE Policy Manager module 281 (e.g., for management in EPS and 5GS interworking) that may be configured for transmitting, to a mobility management entity (MME), a request for a UE policy from a policy control function (PCF) and receiving the UE policy from the MME, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

According to previously known techniques, a variety of policies may be made available to a UE. Among these policies are EPS policies which may provision configuration parameters, e.g. ANDSF rules, to a UE via user plane OMA-DM. 3GPP Technical Standards (TS) 23.402 and 24.312 describe this provisioning. Other means of provisioning these parameters may include storing the parameters in a universal subscriber identity module (USIM) or using implementation specific means. A 5G system allows control-plane provisioning of configuration of UE Policy (i.e., via a policy control function (PCF)), as described in TS23.502 and TS23.503, for Access Network Discovery & Selection Policy (ANDSP) and UE Route Selection Policy (URSP). A 5G system may allow other configuration parameters to be provisioned on a UE via OMA-DM, e.g., packed switched (PS) data off configurations and Internet Protocol (IP) multimedia subsystem (IMS) management objects (MOs)

In previously known techniques (e.g., 3GPP Release 15 (Rel-15)), interworking principles of EPS and 5GS policies are specified in TS24.526. These interworking principles include: for non-3GPP access node selection, a UE should always use access network discovery and selection protocol (ANDSP), if available, including when the UE is registered to a 5G core network (5GCN) via 3GPP access, when the UE is registered to EPC via 3GPP access, or when the UE is not registered to any core network (CN) via 3GPP access. For PDU session management, a UE typically uses UE route selection protocol (URSP) when the UE is registered to 5GCN via 3GPP access, but not registered via non-3GPP access or when the UE is registered to 5GCN via both 3GPP and non-3GPP access. For packet data network (PDN) connection management, a UE typically uses ANDSF and radio access network (RAN) rules, when the UE is registered to the EPC via 3GPP access and not registered via non-3GPP access, or when the UE is registered to the EPC via both 3GPP and non-3GPP access. When a UE is registered to the 5GC via 3GPP access and to the EPC via non-3GPP access, then the UE typically uses ANDSF rules and RAN rules for traffic that travels via the evolved packet data gateway (ePDG) and uses URSP for all other traffic. When a UE is registered to the EPC via 3GPP access and to the 5GC via non-3GPP access, then the UE typically uses URSP only for traffic that travels via a non-3GPP interworking function (N3IWF) and uses ANDSF rules and RAN rules for all other traffic.

Figure 3A:
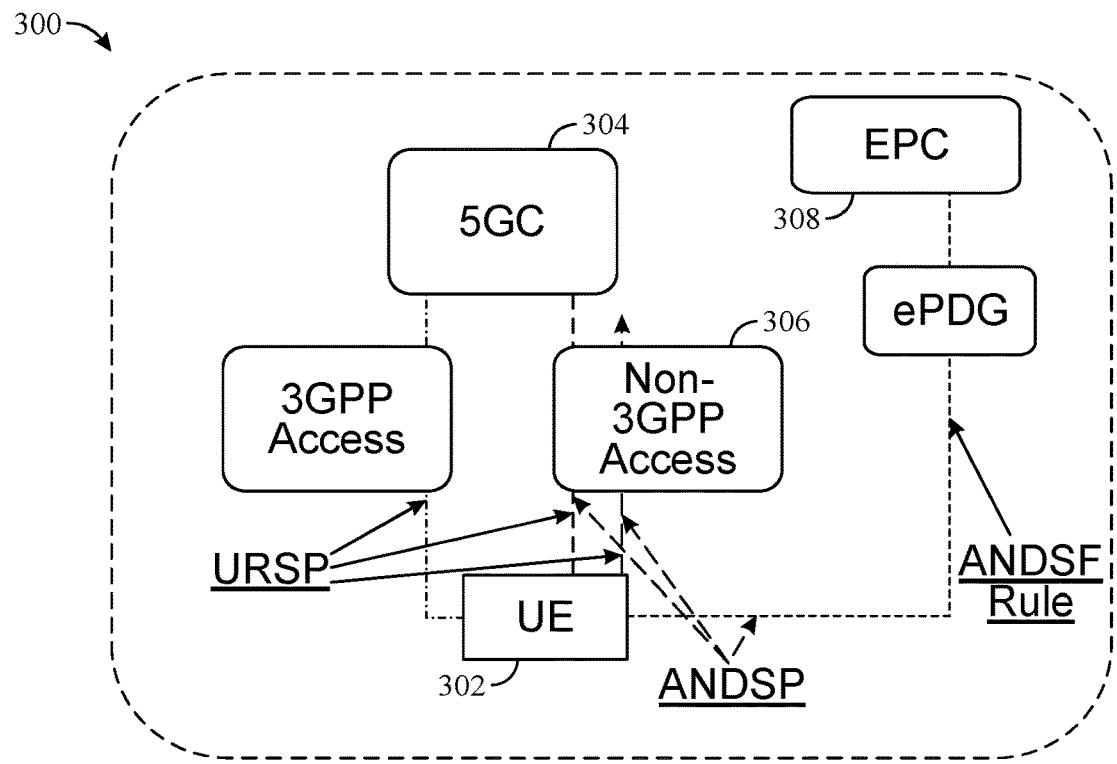
FIG. 3A shows an exemplary network architecture wherein a UE is registered to a 5G core (5GC) via non-3GPP access, in accordance with certain aspects of the present disclosure.

FIG. 3A shows an exemplary network architecture 300 wherein a UE 302 is registered to a 5G core (5GC) 304 via non-3GPP access 306. As described above, the UE accesses the 5GC using USRP and accesses EPC 308 via ANDSF rules.

Figure 3B:
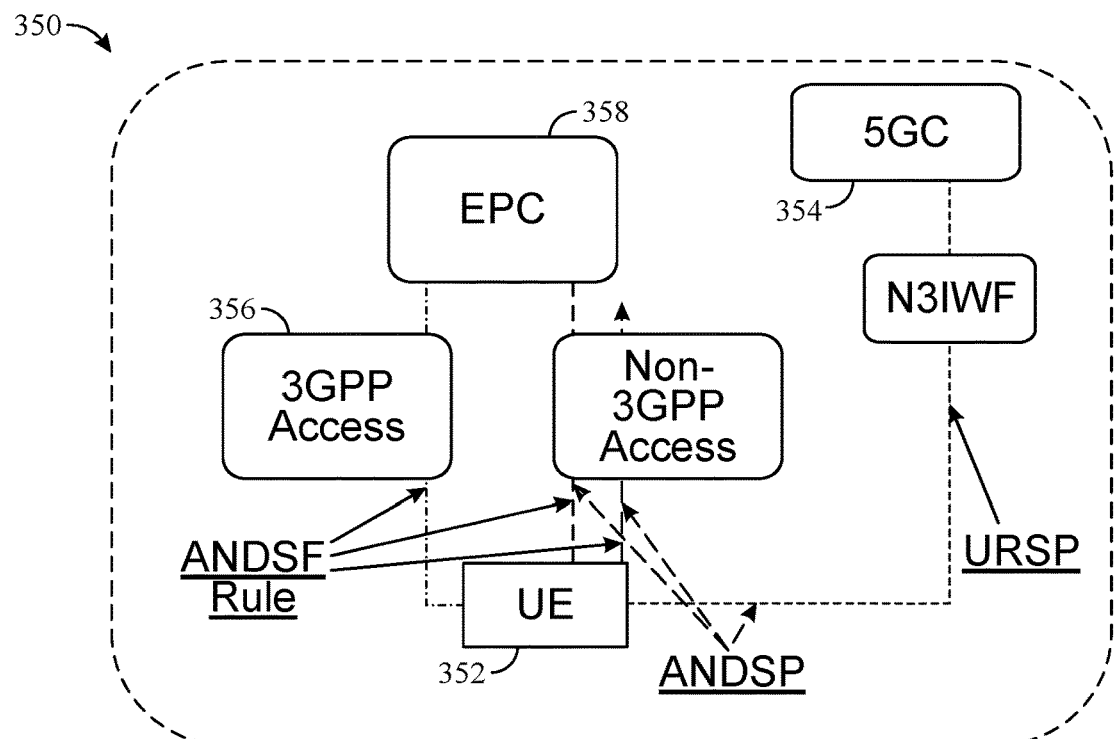
FIG. 3B shows an exemplary network architecture wherein a UE is registered to an EPC via 3GPP access, in accordance with certain aspects of the present disclosure.

FIG. 3B shows an exemplary network architecture 350 wherein a UE 352 is registered to an EPC 358 via 3GPP access 306. As described above, the UE accesses the 5GC 354 and the EPC 358 using ANDSF rules.

Example User Equipment Policy Management in Interworking Evolved Packet Systems and Fifth Generation Systems In previously known techniques in EPS, when ANDSF is not deployed or used, there may be no dynamic provisioning mechanism to allow a network operator to configure the UE when the UE is registered to EPC only. For initial 5G deployments, the 5GC coverage may be limited, as areas with non-standalone 5G network will still use EPC. Therefore, a UE in such areas cannot be provisioned via 5G mechanisms, i.e., via PCF.

In addition, a network operator that operates both EPS and 5GS would typically prefer to simplify the policy management, i.e., to avoid using separate ANDSF and PCF.

Also, for EPS, the ANDSF rules (either from the ANDSF via OMA-DM, or from a $3^{rd}$ party server) have to be delivered over a user plane connection, which requires ANDSF rules to be properly setup.

Therefore, it is desirable to develop a solution for UE Policy Control in EPS that does not require ANDSF.

According to aspects of the present disclosure, an MME may access a PCF directly or through an interworking function (IWF). After a UE attaches to an EPC, the UE initiates the UL NAS Transport signaling towards the MME. In the NAS message, the UE may indicate that the message type is for Policy Provisioning. The contents of the message may be the UE Policy Container, i.e., a policy container similar to that used in the 5GC and described in TS23.502 and TS23.503.

In aspects of the present disclosure the UE policy container may have an extension to support rules relevant to EPS. This allows the PCF to determine to deliver only the relevant policies or to reformat the policies to suit EPS usage.

According to aspects of the present disclosure, the MME may locate a PCF and forward the UE Policy container (received from the UE) to the PCF. The MME may forward the UE Policy container to the PCF via a direct interface with PCF. Additionally the MME may be able to select the PCF that can support UE Policy provisioning, e.g. based on pre-configuration of the MME or via a domain name system (DNS) query for PCFs that can support UE Policy provisioning.

Additionally or alternatively, if an MME supports Service Based Interfaces (SBI), the MME can obtain a PCF address via a network function (NF) repository function (NRF), and use the service provided by PCF, e.g., the Npcf services, as defined in TS23.502, to obtain the UE Policy from the PCF.

Additionally or alternatively, an MME can interact with an interworking function that translates peer-to-peer (p2p) messages, e.g., Diameter to Npcf, to query a PCF for a UE Policy.

In aspects of the present disclosure, to facilitate the PCF obtaining the UE Policy from a unified data repository (UDR), the UE may provide, in the UE Policy Container, a subscription concealed identifier (SUCI) of the UE or information from which a subscription permanent identifier (SUPI) of the UE can be derived, to be used by the PCF.

According to aspects of the present disclosure, a PCF may send the UE Policy towards the UE (i.e., towards the MME) based on the indication (e.g., the SUCI or the information indicating the SUPI) UE included in the UE Policy container.

In aspects of the present disclosure, a UE may request the URSP, or the ANDSP, and alternatively the ANDSF rules for EPS.

Figure 4:
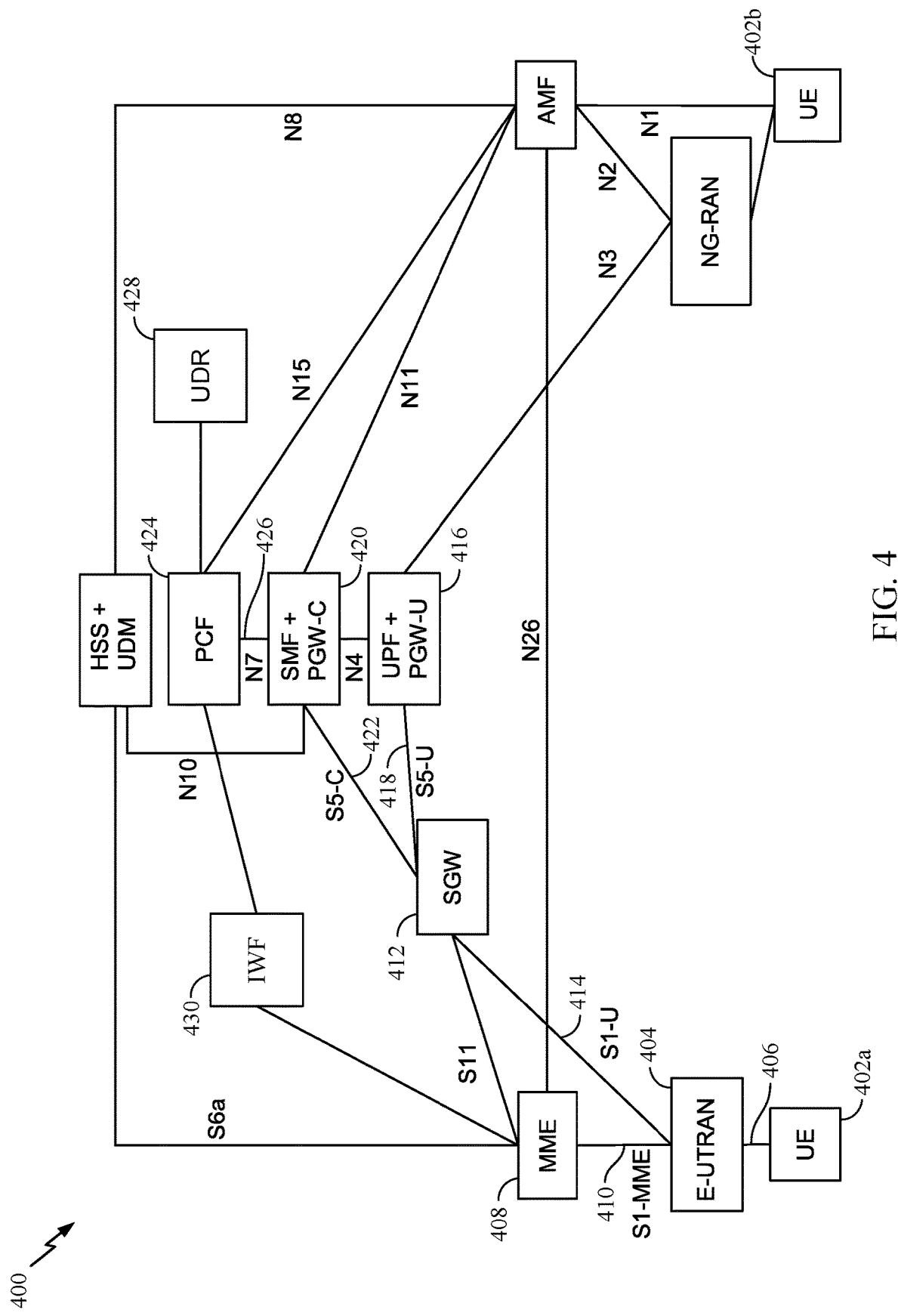
FIG. 4 illustrates an example logical architecture of a combined EPS and 5GS access network with an interworking function (IWF), in accordance with certain aspects of the present disclosure.

FIG. 4 illustrates an example logical architecture 400 of a combined EPS and 5GS access network, which may be implemented in the wireless communication system illustrated in FIG. 1. A UE 402a may access an E-UTRAN access network (RAN) 404 via an air interface 406. The E-UTRAN may communicate control-plane information with an MME 408 via an S1-MME interface 410. The E-UTRAN may communicate user-plane information with a serving gateway (SGW) 412 via an S1-U interface 414. The SGW may communicate with a user plane function (UPF) plus packet gateway for user information (PGW-U) 416 via an S5-U interface 418. The SGW may communicate with a session management function (SMF) plus packet gateway for control information (PGW-C) 420 via an S5-C interface 422. The SMF+PGW-C may communicate with a PCF 424 via an N7 interface 426.

According to aspects of the present disclosure, and as mentioned above, the MME 408 may communicate with the PCF 424 (e.g., to obtain a UE Policy for UE 402a) via an interworking function (IWF) 430.

In aspects of the present disclosure, the MME 408 may access the PCF 424 using a session based communication technique.

According to aspects of the present disclosure, a UE may use a cellular Internet of things (CIOT) control-plane optimization mechanism to deliver the request over the control plane. The UE may set up a special PDN connection for the provisioning of the UE policy via the MME, by for example using a special access point name (APN) configured for this purpose.

Instead of establishing a connection towards a UPF+PGW-U 416 (i.e., as described above), or a service capability exposure function (SCEF), the SMF+PGW-C 420 may set up a connection toward the PCF 424 for this purpose. The PCF may support an S11-U-like interface 530 from the MIME.

Alternatively or additionally, the PCF 424 may act as an SCEF (i.e., with a T6a interface), and the MME 408 could directly forward the message to the PCF 424 via a direct interface 532.

In aspects of the present disclosure, UE Policies may be sent back to the UE 402a from the PCF 424 via the same path as the path used by the request for the UE policy.

According to aspects of the present disclosure, when attaching to the EPC, a UE may include a UE Policy Container in a protocol configuration option (PCO) within the PDN connection establishment request. The MME may forward the message toward an SGW and in turn the SMF+PGW-C. The SMF+PGW-C may forward the UE Policy Container to the PCF over an N7 interface when interacting with the PCF. The PCF obtains the UE Policy from the unified data repository (UDR) 428 using an Nudr_DM_Query service.

In aspects of the present disclosure, the UE may also provide an SUPI in the UE Policy Container.

Note that in previously known techniques, the session based PCF does not provide a UE Policy provisioning function.

According to aspects of the present disclosure, the UE Policies may be returned from the PCF via SMF+PGW-C to the MME using PCO, which will be forwarded to the UE.

Figure 5:
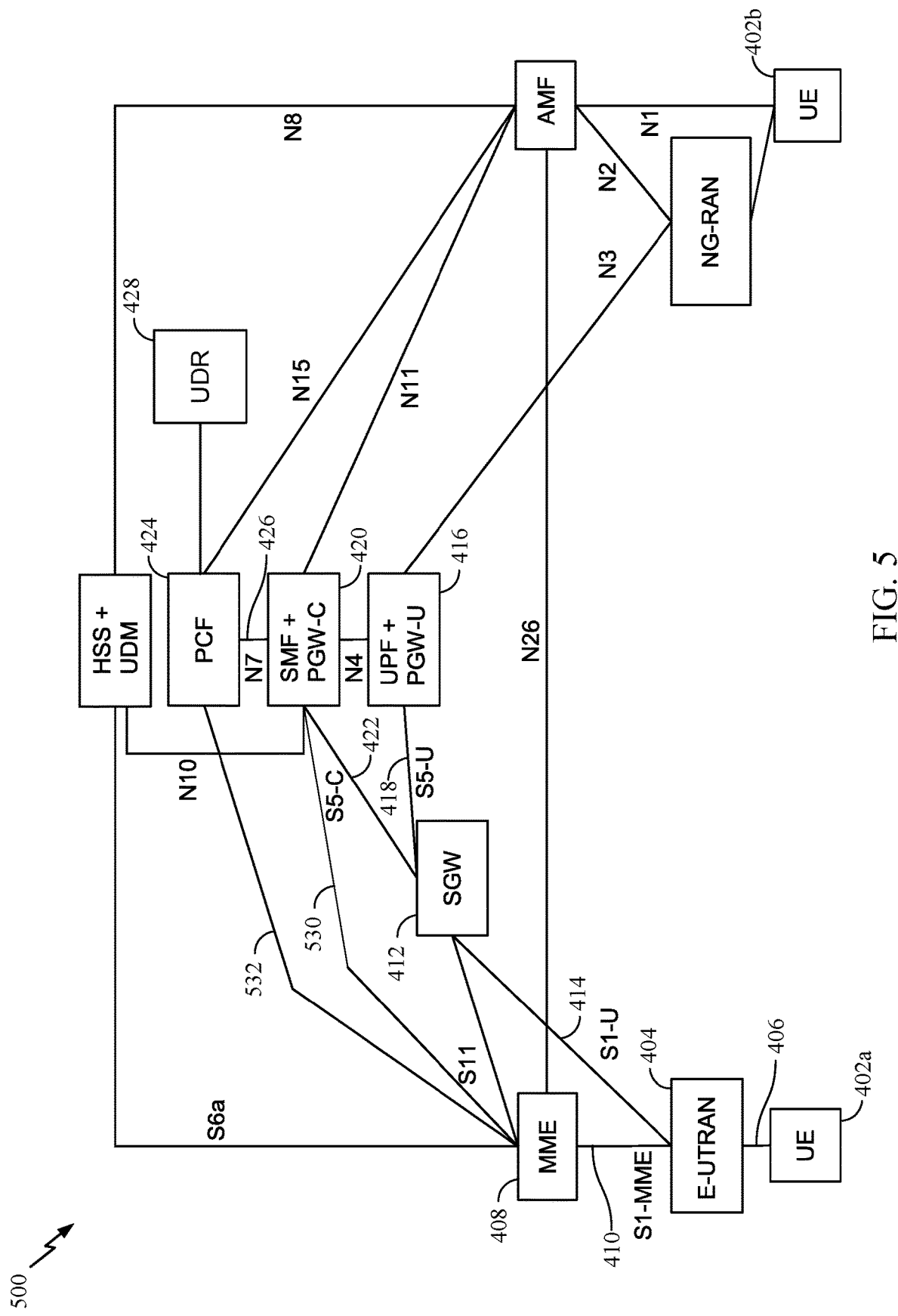
FIG. 5 illustrates an example logical architecture of a combined EPS and 5GS access network with additional interfaces to the mobility management entity, in accordance with certain aspects of the present disclosure.

FIG. 5 illustrates an example logical architecture 500 of a combined EPS and 5GS access network, which may be implemented in the wireless communication system illustrated in FIG. 1. The example logical architecture 500 is similar to the example logical architecture 400, shown in FIG. 4, and thus similar objects will not be further described. The MME 408 may communicate with the SMF+PGW-C 420 via an S11-like interface 530. Additionally or alternatively, the MME may communicate with the PCF via a direct interface 532.

In aspects of the present disclosure, an MME may access a PCF via an AMF. When the UE attaches to EPC, the UE may indicate the UE supports 5G NAS in a UE Network Capability message. Additionally, the UE may provide a UE Policy Container in the Attach Request.

According to aspects of the present disclosure, if the MME has N26 interface with the AMF, or is collocated with the AMF, then the MME may forward the UE Policy Container to the AMF. The AMF may then perform the UE Policy Association Establishment procedure, as defined in TS23.502, to obtain the UE Policy.

In aspects of the present disclosure, the MME may provide the AMF with information regarding the UE ID, e.g. some mapped SUPI, so that the AMF can obtain the corresponding UE Policy.

According to aspects of the present disclosure, when the AFF receives the UE Policy Container from the PCF, the AMF may forward that UE Policy Container to the MME, instead of trying to directly deliver the UE Policy Container to the UE.

In aspects of the present disclosure, the MME may use a DL non-access stratum (NAS) transport message to forward the UE Policy Container to the UE.

According to aspects of the present disclosure, a UE which receives a UE Policy when connected EPC may accommodate route selection components that do not apply to EPC access.

According to aspects of the present disclosure, if only URSP is provided to the UE via the signaling from 5GC then some of the Route Selection Components doesn't apply to EPC access, for example: Ethernet PDU session type, Unstructured PDU session type; SSC modes; and Network Slice selection.

In aspects of the present disclosure, a UE may search for the RSDs without the parameters italicized in the chart below. Or the UE can simply ignore those parameters not applicable to EPC, if all RSDs include such parameters. Alternatively, the PCF may include additional flags in the URSP rules to indicate which URSP rule(s) is suitable for the application in EPS. Furthermore, the PCF may also include additional mapping criteria or rules on how to apply the URSP route selection descriptors (RSDs) to the EPS, e.g. by changing the data network name (DNN) with a fixed rule. One example of such mapping could be that the DNN can be combined with single Network Slice Selection Assistance Information (S-NSSAI) to form a special APN for use in EPS. Or, the DNN can be expanded with "eps" at the end or in front to indicate it is used in EPS. Such mapping of the RSDs can be also well specified, or standardized, e.g. the PDU session type of Ethernet may be mapped to Ethernet or non-IP for PDN Connection types depends on EPS and UE's capabilities, and the protocol data unit (PDU) session type of "unstructured" can be mapped to "non-IP" PDN Connection type.

Alternatively, the URSP may be enhanced to include a special RSD with an indicator, such that it can be used in EPC.

| Route selection components | This part defines the route selection components | Mandatory | | |
|---|---|---|---|---|
| SSC Mode Selection | One single value of SSC mode. | Optional | Yes | UE context |
| Network Slice Selection | Either a single value or a list of values of S-NSSAI(s) | Optional | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-seamless Offload indication | Indicates if the traffic of the matching application is to be offloaded to non-3 GPP access outside of a PDU Session. | Optional | Yes | UE context |
| Access Type preference | Indicates the preferred Access Type (3 GPP or non-3 GPP) when the UE establishes a PDU Session for the matching application. | Optional | Yes | UE context |

According to aspects of the present disclosure, a UE can use the received ANDSP directly, when the ANDSP has been designed to be applicable to both EPC and 5GC.

In aspects of the present disclosure, ANDSP for 5GS may contain a superset of wireless local area network selection policy (WLANSP) rules in ANDSF for EPS and other info for 5GS use, including parameters that can be included in WLANSP rules in ANDSP is the same as that which can be included in WLANSP rules in ANDSF for EPS.

According to aspects of the present disclosure, ANDSP may contain information for both non-3GPP interworking function (N3IWF) and evolved packet data gateway (ePDG) selection.

In aspects of the present disclosure, ANDSP may always used for non-3GPP node selection when available, to allow a UE to select the best node for either ePDG or N3IWF.

| Information name | Description | Category | PCF permitted to modify in a UE context | Scope |
|---|---|---|---|---|
| WLANSP rules | 1 or more WLANSP rules as specified in 4.8.2.1.6 of TS 23.402 [9] | Mandatory | Yes | UE context |
| ePDG identifier configuration | The UE uses this information to select ePDG as defined in clause 6.3.6.1 of TS 23.501 [2] | Optional | Yes | UE context |

-continued

| Information name | Description | Category | PCF permitted to modify in a UE context | Scope |
|---|---|---|---|---|
| N3IWF identifier configuration | The UE uses this information to select N3IWF as defined in clause 6.3.6.1 of TS 23.501 [2] | Optional | Yes | UE context |
| Non-3GPP access node (N3AN) selection information | The UE uses this information to select ePDG or N3IWF as defined in clause 6.3.6.1 of TS 23.501 [2] | Optional | Yes | UE context |

Figure 6:
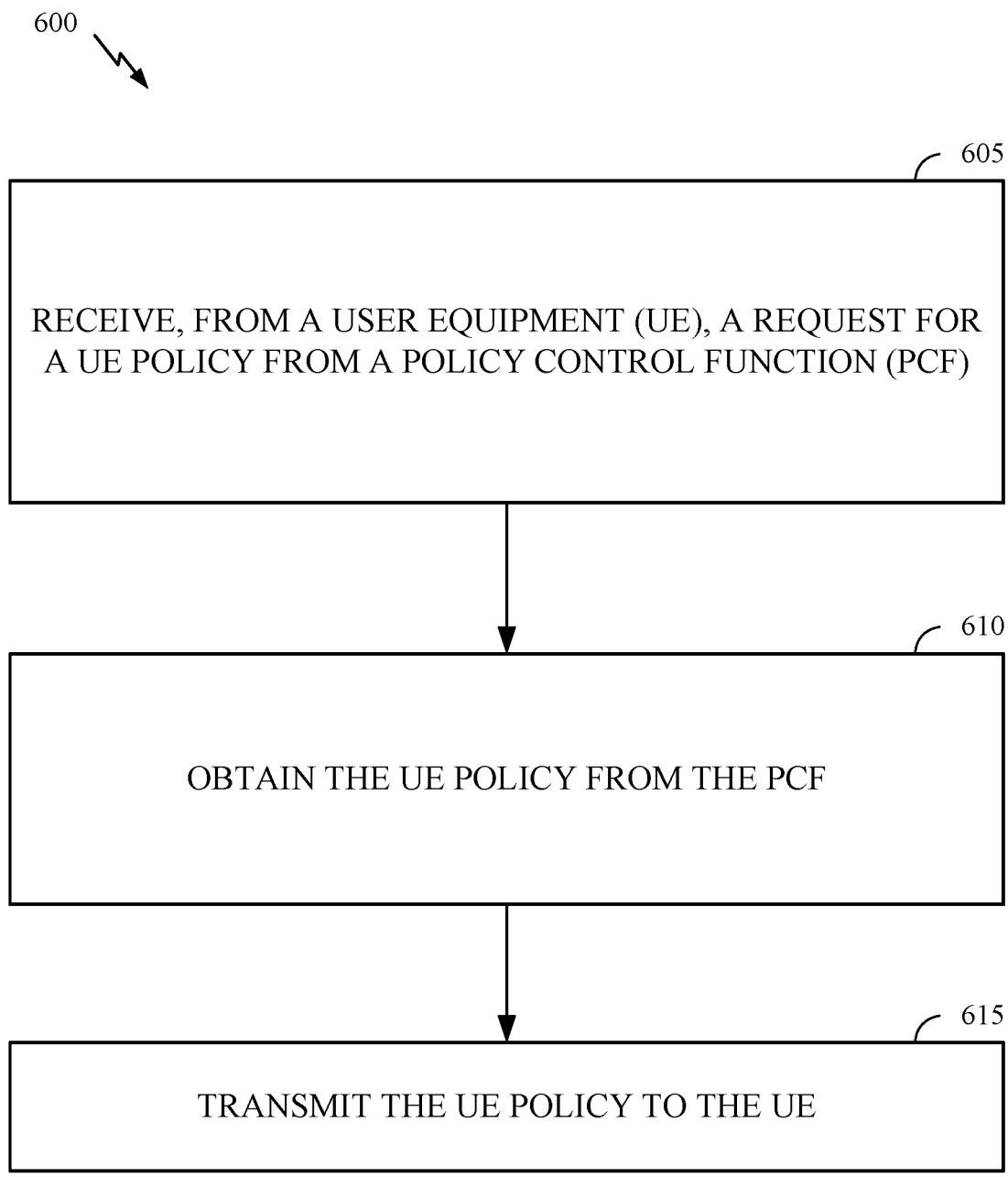
FIG. 6 is a flow diagram illustrating example operations for wireless communication by a mobility management entity (MME), in accordance with certain aspects of the present disclosure.

FIG. 6 is a flow diagram illustrating example operations 600 for wireless communication, in accordance with certain aspects of the present disclosure. The operations 600 may be performed, for example, by a mobility management entity (e.g., an MME included in BS 110 in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by the MME receiving, from a user equipment (UE), a request for a UE policy from a policy control function (PCF). For example, an MME 408, which may be included in the BS 110a or the network controller 130, may receive, from a UE 402a, a request for a UE policy from a PCF 424 (e.g., via the IWF 430) within the BS 110a or the network controller 130.

At block 610, operations 600 continue with the MME obtaining the UE policy from the PCF. Continuing the example, the MME 408 obtains the UE policy from the PCF 424 (e.g., via the IWF 430).

Operations 600 continue at block 615 with the MME transmitting the UE policy to the UE. Continuing the example above, the MME 408 transmits the UE policy obtained in block 610 to the UE 402a.

Figure 7:
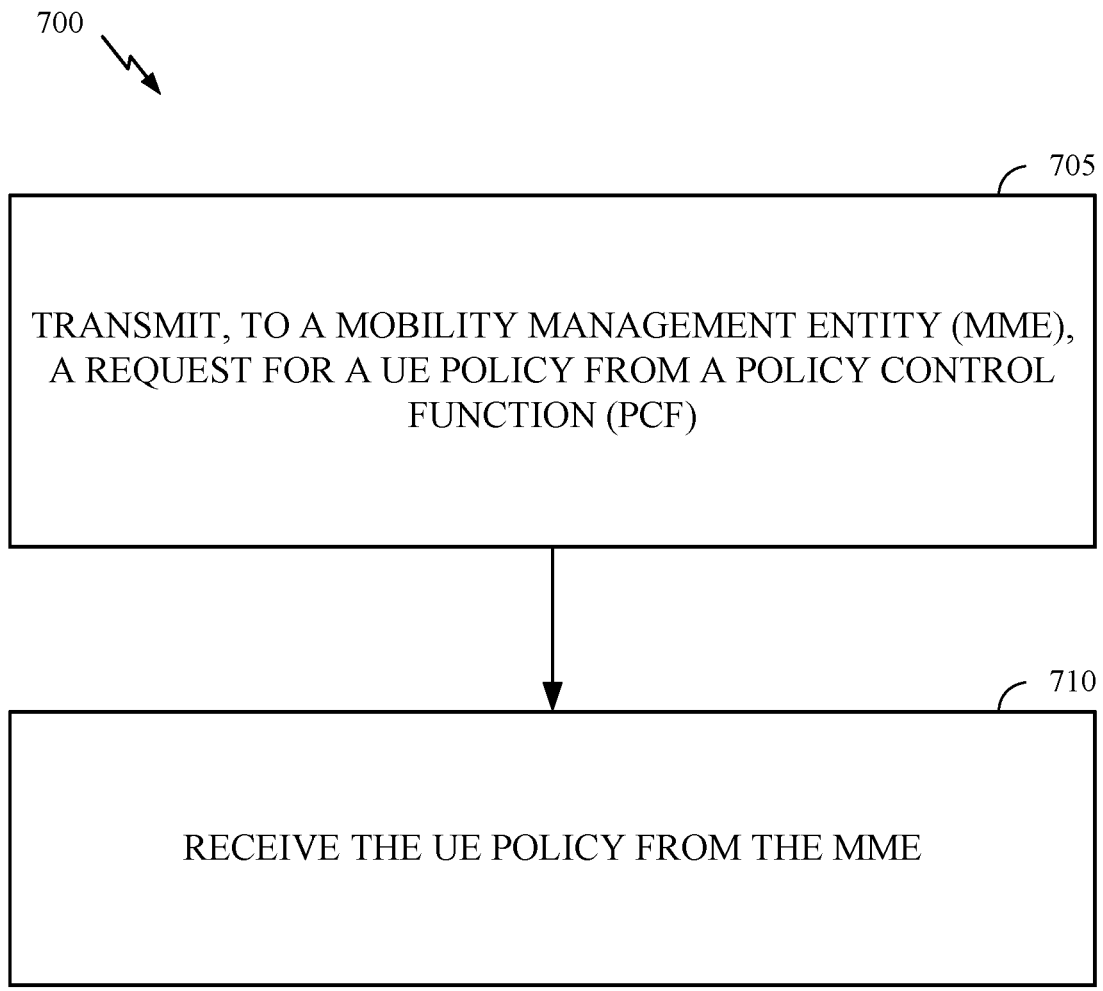
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as a UE 120 in the wireless communication network 100). The operations 700 may be complimentary operations by the UE to the operations 600 performed by the MME of the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by the UE transmitting, to a mobility management entity (MME), a request for a UE policy from a policy control function (PCF). For example, the UE 402a may transmit, to an MME 408 within the BS 110a or the network controller 130, a request for a UE policy.

Operations 700 may continue, at block 710, with the UE receiving the UE policy from the MME. Continuing the example, the UE 402a receives the UE policy from the MME 408, which may be in the BS 110a or network controller 130.

Figure 8:
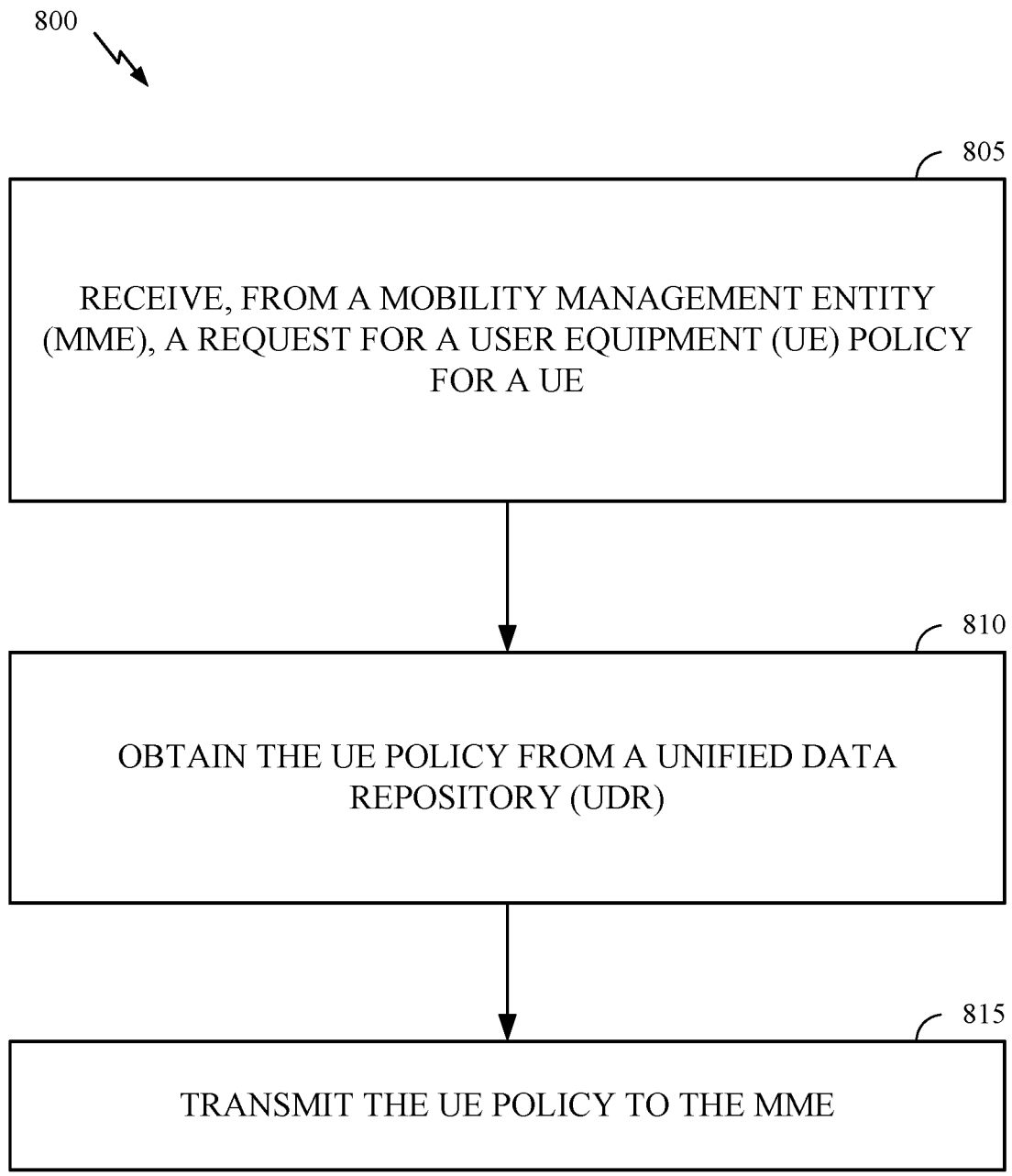
FIG. 8 is a flow diagram illustrating example operations for wireless communication by a policy control function (PCF), in accordance with certain aspects of the present disclosure.

FIG. 8 is a flow diagram illustrating example operations 800 for wireless communication, in accordance with certain aspects of the present disclosure. The operations 800 may be performed, for example, by a policy control function in a BS (e.g., such as a BS 110 in the wireless communication network 100). Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 805, by the PCF receiving, from a mobility management entity (MME), a request for a user equipment (UE) policy for a UE. For example, a PCF of the BS 110a or the network controller 130 receives, from the MME 408 within the BS 110a or the network controller 130, a request for a UE policy for the UE 402a.

Operations 800 continue at block 810 with the PCF obtaining the UE policy from a unified data repository (UDR). Continuing the example, the PCF 424 of the BS 110a or the network controller 130 obtains the UE policy from the UDR 428.

At block 815, operations 800 continue with the PCF transmitting the UE policy to the MME. Continuing the example, the PCF 424 of the BS 110a or network controller 130 transmits the UE policy obtained in block 810 to the UE 402a.

Figure 9:
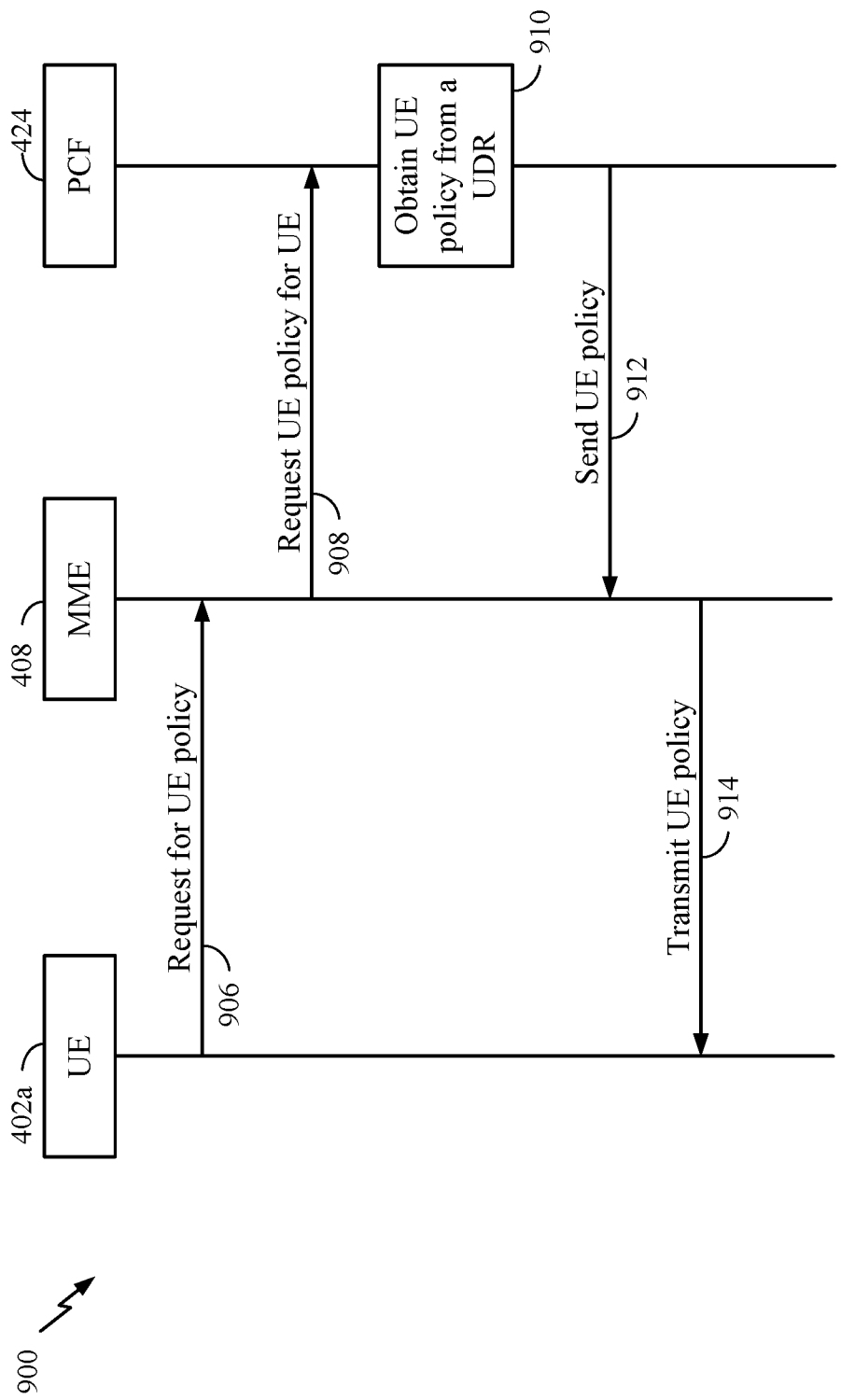
FIG. 9 is a call flow of example communications between a UE, an MME, and a PCF to determine UE policy, in accordance with certain aspects of the present disclosure.

FIG. 9 is a call flow diagram 900 illustrating example communications for UE policy management, in accordance with certain aspects of the present disclosure. As shown, at 906, the UE 402a may send a request for a UE policy at 906 to an MME 408. Upon receiving the request from the UE, the MME may send (e.g., directly or via an IWF 430) a request for the UE policy at 908 to a PCF 424. At 910, the PCF may then obtain the requested UE policy from a UDR (e.g., the UDR 428 of FIG. 4). Once the PCF 424 obtains the UE policy from the UDR, the PCF 424 may send the UE policy to the MME 408 at 912, and the MME 408 may then transmit, at 914, the UE policy to the UE 402a.

Figure 10:
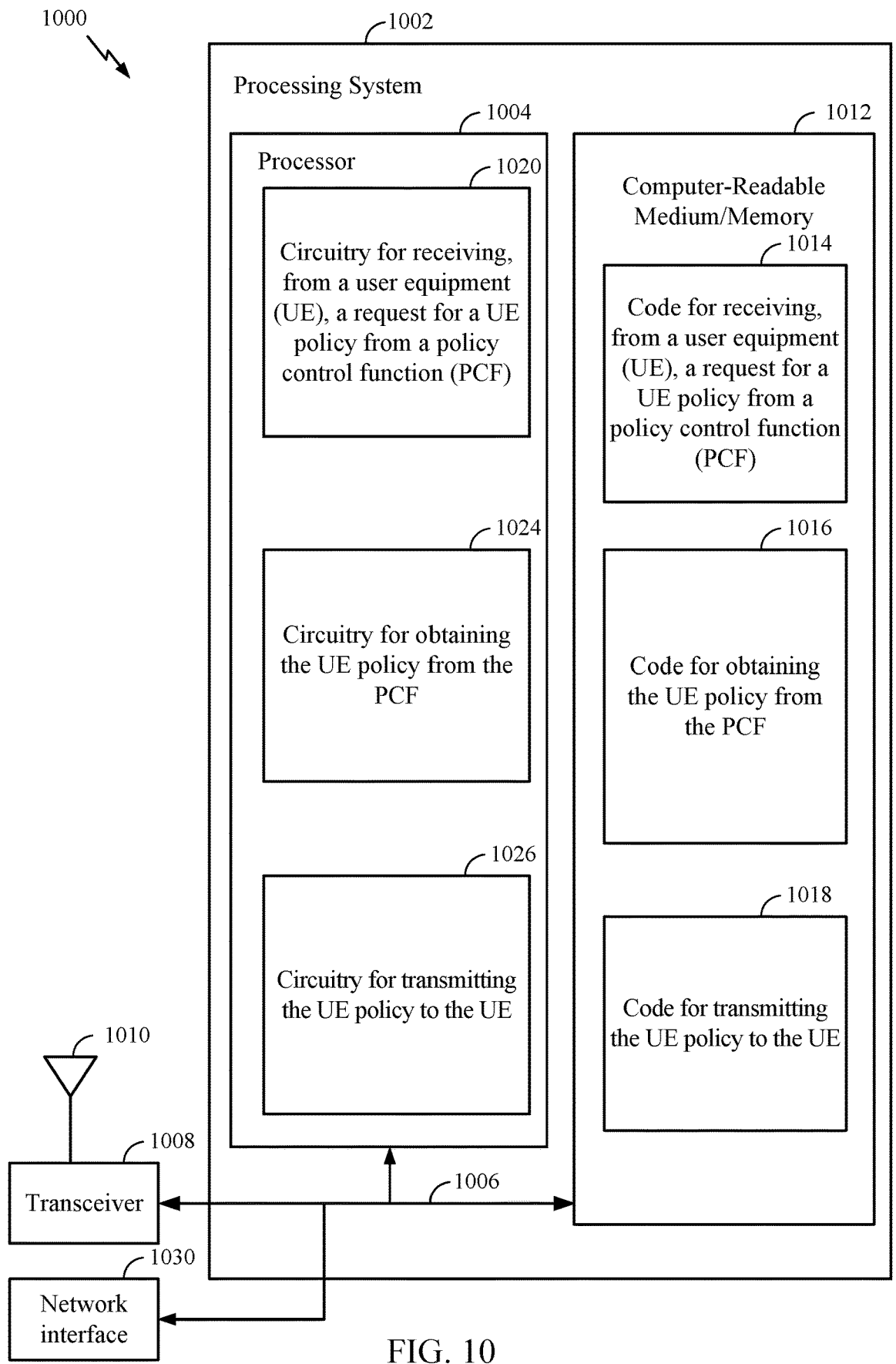
FIG. 10 illustrates a communications device that may include various components configured to perform operations for the techniques disclosed in FIG. 6.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008 and a network interface 1030. The transceiver 1008 is configured to transmit and receive signals for the communications device 1000 via an antenna 1010, such as the various signals described herein. The network interface 1030 is configured to send and receive signals for the communications device 1000 via a wired network, such as the various signals described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, or other operations for performing the various techniques discussed herein for UE policy management in interworking evolved packet systems and fifth generation systems. In certain aspects, computer-readable medium/memory 1012 stores code 1014 for receiving, from a user equipment (UE), a request for a UE policy from a policy control function (PCF), code 1016 for obtaining the UE policy from the PCF, and code 1018 for transmitting the UE policy to the UE. In certain aspects, the processor 1004 has circuitry configured to implement the code stored in the computer-readable medium/memory 1012. The processor 1004 includes circuitry 1020 for receiving, from a user equipment (UE), a request for a UE policy from a policy control function (PCF), circuitry 1024 for obtaining the UE policy from the PCF, and circuitry 1026 for transmitting the UE policy to the UE.

Figure 11:
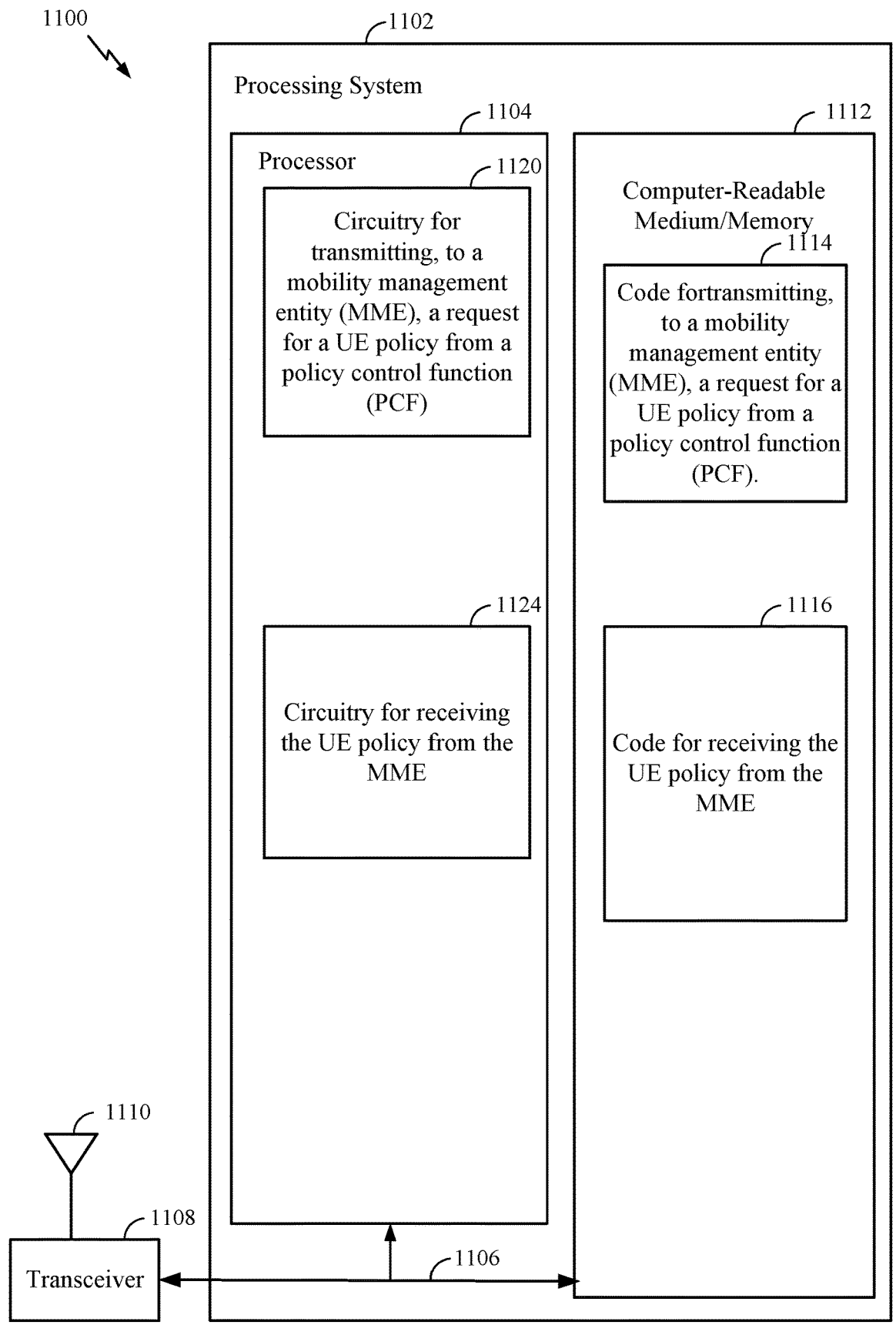
FIG. 11 illustrates a communications device that may include various components configured to perform operations for the techniques disclosed in FIG. 7.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 7, or other operations for performing the various techniques discussed herein for UE policy management in interworking evolved packet systems and fifth generation systems. In certain aspects, computer-readable medium/memory 1112 stores code 1114 for transmitting, to a mobility management entity (MME), a request for a UE policy from a policy control function (PCF) and code 1116 for receiving the UE policy from the MME. In certain aspects, the processor 1104 has circuitry configured to implement the code stored in the computer-readable medium/memory 1112. The processor 1104 includes circuitry 1120 for transmitting, to a mobility management entity (MME), a request for a UE policy from a policy control function (PCF) and circuitry 1124 for receiving the UE policy from the MME.

Figure 12:
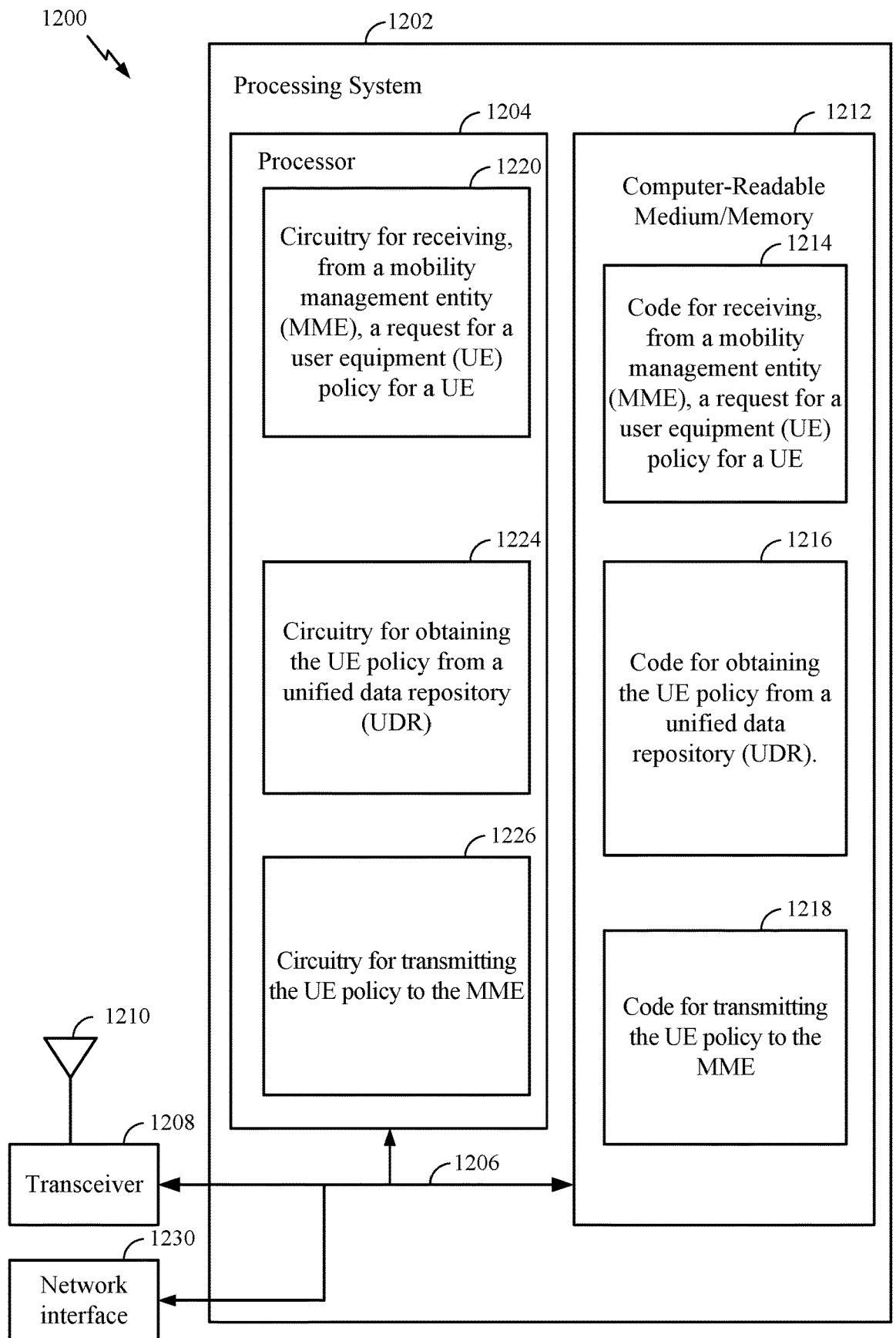
FIG. 12 illustrates a communications device that may include various components configured to perform operations for the techniques disclosed in FIG. 8.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 and a network interface 1230. The transceiver 1208 is configured to transmit and receive signals for the communications device 1200 via an antenna 1210, such as the various signals described herein. The network interface 1230 is configured to send and receive signals for the communications device 1200 via a wired network, such as the various signals described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein for UE policy management in interworking evolved packet systems and fifth generation systems. In certain aspects, computer-readable medium/memory 1012 stores code 1214 for receiving, from a mobility management entity (MME), a request for a user equipment (UE) policy for a UE, code 1216 for obtaining the UE policy from a unified data repository (UDR), and code 1218 for transmitting the UE policy to the MME. In certain aspects, the processor 1204 has circuitry configured to implement the code stored in the computer-readable medium/memory 1212. The processor 1204 includes circuitry 1220 for receiving, from a mobility management entity (MME), a request for a user equipment (UE) policy for a UE, circuitry 1224 for obtaining the UE policy from a unified data repository (UDR), and circuitry 1226 for transmitting the UE policy to the MME.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Example Embodiments

Embodiment 1: A method for wireless communications by a mobility management entity (MME), comprising receiving, from a user equipment (UE), a request for a UE policy from a policy control function (PCF); obtaining the UE policy from the PCF; and transmitting the UE policy to the UE.

Embodiment 2: The method of Embodiment 1, wherein the request comprises a non-access stratum (NAS) message containing a UE Policy Container for a 5th generation (5G) network.

Embodiment 3: The method of Embodiment 2, wherein the UE Policy Container is configured to support evolved packet system (EPS) rules.

Embodiment 4: The method of any of Embodiments 1-3, wherein obtaining the UE policy comprises requesting the UE policy via a direct interface to the PCF.

Embodiment 5: The method of any of Embodiments 1-3, further comprising determining the PCF that supports provisioning the UE policy.

Embodiment 6: The method of any of Embodiments 1-5, wherein obtaining the UE policy comprises obtaining an address for the PCF from a network function (NF) repository function (NRF); requesting the UE policy from the PCF at the address using an Access and Mobility Policy Control Service (Npcf).

Embodiment 7: The method of any of Embodiments 1-6, wherein obtaining the UE policy comprises requesting the UE policy from the PCF via an interworking function (IWF).

Embodiment 8: The method of any of Embodiments 1-7, wherein the request comprises a subscription permanent identifier (SUPI) of the UE.

Embodiment 9: The method of any of Embodiments 1-8, wherein the request comprises information from which a subscription permanent identifier (SUPI) of the UE can be derived.

Embodiment 10: The method of Embodiment 9, wherein the information comprises a subscription concealed identifier (SUCI) of the UE.

Embodiment 11: The method of any of Embodiments 1-10, wherein the UE policy comprises at least one of a UE route selection protocol (URSP), an access network discovery and selection protocol (ANDSP), or a set of access network discovery and selection function (ANDSF) rules for an evolved packet system (EPS).

Embodiment 12: The method of any of Embodiments 1-11, wherein obtaining the UE policy comprises obtaining the UE policy via a packet data network (PDN) connection to the PCF through a serving gateway (SGW) and a session management function plus packet gateway for control information (SMF+PGW-C).

Embodiment 13: The method of any of Embodiments 1-12, wherein the request includes a UE policy container in a policy configuration option (PCO) in a packet data network (PDN) connection establishment or modification request.

Embodiment 14: The method of any of Embodiments 1-13, wherein the request includes a UE policy container in an evolved packet system (EPS) attachment request.

Embodiment 15: The method of any of Embodiments 1-14, wherein obtaining the UE policy comprises forwarding a UE policy container to an access management and mobility function (AMF); and receiving the UE policy container with the UE policy from the AMF; and wherein transmitting the UE policy to the UE comprises: forwarding the UE policy container with the UE policy to the UE via a downlink (DL) non-access stratum (NAS) transport message.

Embodiment 16: A method for wireless communications by a user equipment (UE), comprising transmitting, to a mobility management entity (MME), a request for a UE policy from a policy control function (PCF); and receiving the UE policy from the MME.

Embodiment 17: The method of Embodiment 16, wherein the request comprises a non-access stratum (NAS) message containing a UE Policy Container for a 5th generation (5G) network that is configured to support evolved packet system (EPS) rules.

Embodiment 18: The method of any of Embodiments 16-17, wherein the request comprises a subscription permanent identifier (SUPI) of the UE.

Embodiment 19: The method of any of Embodiments 16-18, wherein the request comprises information from which a subscription permanent identifier (SUPI) of the UE can be derived.

Embodiment 20: The method of Embodiment 19, wherein the information comprises a subscription concealed identifier (SUCI) of the UE.

Embodiment 21: The method of any of Embodiments 16-20, wherein the request comprises a request for at least one of a UE route selection protocol (URSP), an access network discovery and selection protocol (ANDSP), or a set of access network discovery and selection function (ANDSF) rules for an evolved packet system (EPS).

Embodiment 22: The method of any of Embodiments 16-21, wherein the request includes a UE policy container in a policy configuration option in a packet data network (PDN) connection establishment request.

Embodiment 23: The method of any of Embodiments 16-22, wherein the request includes a UE policy container in an evolved packet system (EPS) attachment request.

Embodiment 24: A method for wireless communications by a policy control function (PCF), comprising receiving, from a mobility management entity (MME), a request for a user equipment (UE) policy for a UE; obtaining the UE policy from a unified data repository (UDR); and transmitting the UE policy to the MME.

Embodiment 25: The method of Embodiment 24, wherein the request comprises a non-access stratum (NAS) message containing a UE Policy Container for a 5th generation (5G) network that is configured to support evolved packet system (EPS) rules.

Embodiment 26: The method of any of Embodiments 24-25, wherein the request is received via a direct interface from the MME.

Embodiment 27: The method of any of Embodiments 24-26, wherein the request is received via an Access and Mobility Policy Control Service (Npcf).

Embodiment 28: The method of any of Embodiments 24-27, wherein the request is received via an interworking function (IWF).

Embodiment 29: The method of any of Embodiments 24-28, wherein the request comprises a subscription permanent identifier (SUPI) of the UE, and obtaining the UE policy comprises querying the UDR for the UE policy corresponding to the SUPI.

Embodiment 30: The method of any of Embodiments 24-29, wherein the request comprises information from which a subscription permanent identifier (SUPI) of the UE can be derived, and obtaining the UE policy comprises: determining the SUPI of the UE, based on the information; and querying the UDR for the UE policy corresponding to the SUPI.

Embodiment 31: The method of Embodiment 30, wherein the information comprises a subscription concealed identifier (SUCI) of the UE.

Embodiment 32: The method of any of Embodiments 24-31, wherein the UE policy comprises at least one of a UE route selection protocol (URSP), an access network discovery and selection protocol (ANDSP), or a set of access network discovery and selection function (ANDSF) rules for an evolved packet system (EPS).

Embodiment 33: The method of any of Embodiments 24-32, wherein the request is received via a packet data network (PDN) connection through a serving gateway (SGW) and a session management function plus packet gateway for control information (SMF+PGW-C).

Embodiment 34: The method of any of Embodiments 24-33, wherein the request from the MME is received via an access management and mobility function (AMF), and the UE policy is transmitted via the AMF.

Embodiment 35: An apparatus for wireless communications, comprising: a memory; and a processor coupled with the memory, the memory and the processor configured to: receive, from a user equipment (UE), a request for a UE policy from a policy control function (PCF); obtain the UE policy from the PCF; and transmit the UE policy to the UE.

Embodiment 36: The apparatus of Embodiment 35, wherein the memory and the processor are configured to receive the request by receiving a non-access stratum (NAS) message containing a UE Policy Container for a 5th generation (5G) network.

Embodiment 37: The apparatus of Embodiment 36, wherein the UE Policy Container is configured to support evolved packet system (EPS) rules.

Embodiment 38: The apparatus of any of Embodiments 35-37, wherein the memory and the processor are configured to obtain the UE policy by requesting the UE policy via a direct interface to the PCF.

Embodiment 39: The apparatus of any of Embodiments 35-37, the memory and the processor are further configured to determine the PCF that supports provisioning the UE policy.

Embodiment 40: The apparatus of any of Embodiments 35-39, wherein the memory and the processor are configured to obtain the UE policy by obtaining an address for the PCF from a network function (NF) repository function (NRF); requesting the UE policy from the PCF at the address using an Access and Mobility Policy Control Service (Npcf).

Embodiment 41: The apparatus of any of Embodiments 35-40, wherein the memory and the processor are configured to obtain the UE policy by requesting the UE policy from the PCF via an interworking function (IWF).

Embodiment 42: The apparatus of any of Embodiments 35-41, wherein the memory and the processor are configured to obtain, from the request, a subscription permanent identifier (SUPI) of the UE.

Embodiment 43: The apparatus of any of Embodiments 35-42, wherein the memory and the processor are configured to obtain, from the request, information from which a subscription permanent identifier (SUPI) of the UE can be derived.

Embodiment 44: The apparatus of Embodiment 43, wherein the information comprises a subscription concealed identifier (SUCI) of the UE.

Embodiment 45: The apparatus of any of Embodiments 35-44, wherein the memory and the processor are configured to obtain the UE policy by obtaining at least one of a UE route selection protocol (URSP), an access network discovery and selection protocol (ANDSP), or a set of access network discovery and selection function (ANDSF) rules for an evolved packet system (EPS).

Embodiment 46: The apparatus of any of Embodiments 35-45, wherein the memory and the processor are configured to obtain the UE policy via a packet data network (PDN) connection to the PCF through a serving gateway (SGW) and a session management function plus packet gateway for control information (SMF+PGW-C).

Embodiment 47: The apparatus of any of Embodiments 35-46, wherein the memory and the processor are configured to receive the request by receiving a UE policy container in a policy configuration option (PCO) in a packet data network (PDN) connection establishment or modification request.

Embodiment 48: The apparatus of any of Embodiments 35-47, wherein the memory and the processor are configured to receive the request by receiving a UE policy container in an evolved packet system (EPS) attachment request.

Embodiment 49: The apparatus of any of Embodiments 35-48, wherein the memory and the processor are configured to obtain the UE policy by forwarding a UE policy container to an access management and mobility function (AMF); and receiving the UE policy container with the UE policy from the AMF; and wherein the memory and the processor are configured to transmit the UE policy to the UE by: forwarding the UE policy container with the UE policy to the UE via a downlink (DL) non-access stratum (NAS) transport message.

Embodiment 50: An apparatus for wireless communications, comprising a memory; and a processor coupled with the memory, the memory and the processor configured to: transmit, to a mobility management entity (MME), a request for a user equipment (UE) policy from a policy control function (PCF); and receive the UE policy from the MME.

Embodiment 51: The apparatus of Embodiment 50, wherein the memory and the processor are configured to transmit the request by transmitting a non-access stratum (NAS) message containing a UE Policy Container for a 5th generation (5G) network that is configured to support evolved packet system (EPS) rules.

Embodiment 52: The apparatus of any of Embodiments 50-51, wherein the memory and the processor are configured to transmit the request by transmitting a subscription permanent identifier (SUPI) of the apparatus.

Embodiment 53: The apparatus of any of Embodiments 50-52, wherein the memory and the processor are configured to transmit the request by transmitting information from which a subscription permanent identifier (SUPI) of the apparatus can be derived.

Embodiment 54: The apparatus of Embodiment 53, wherein the memory and the processor are configured to transmit the information by transmitting a subscription concealed identifier (SUCI) of the apparatus.

Embodiment 55: The apparatus of any of Embodiments 50-54, wherein the memory and the processor are configured to transmit the request by transmitting a request for at least one of a UE route selection protocol (URSP), an access network discovery and selection protocol (ANDSP), or a set of access network discovery and selection function (ANDSF) rules for an evolved packet system (EPS).

Embodiment 56: The apparatus of any of Embodiments 50-55, wherein the memory and the processor are configured to transmit the request by transmitting a UE policy container in a policy configuration option in a packet data network (PDN) connection establishment request.

Embodiment 57: The apparatus of any of Embodiments 50-56, wherein the memory and the processor are configured to transmit the request by transmitting a UE policy container in an evolved packet system (EPS) attachment request.

Embodiment 58: An apparatus for wireless communications, comprising a memory; and a processor, the memory and the processor configured to: receive, from a mobility management entity (MME), a request for a user equipment (UE) policy for a UE; obtain the UE policy from a unified data repository (UDR); and transmit the UE policy to the MME.

Embodiment 59: The apparatus of Embodiment 58, wherein the memory and the processor are configured to receive the request by receiving a non-access stratum (NAS) message containing a UE Policy Container for a 5th generation (5G) network that is configured to support evolved packet system (EPS) rules.

Embodiment 60: The apparatus of any of Embodiments 58-59, wherein the memory and the processor are configured to receive the request via a direct interface from the MME.

Embodiment 61: The apparatus of any of Embodiments 58-60, wherein the memory and the processor are configured to receive the request via an Access and Mobility Policy Control Service (Npcf).

Embodiment 62: The apparatus of any of Embodiments 58-61, wherein the memory and the processor are configured to receive the request via an interworking function (IWF).

Embodiment 63: The apparatus of any of Embodiments 58-62, wherein the memory and the processor are configured to receive the request by receiving a subscription permanent identifier (SUPI) of the UE, and the memory and the processor are configured to obtain the UE policy by querying the UDR for the UE policy corresponding to the SUPI.

Embodiment 64: The apparatus of any of Embodiments 58-63, wherein the memory and the processor are configured to receive the request by receiving information from which a subscription permanent identifier (SUPI) of the UE can be derived, and the memory and the processor are configured to obtain the UE policy by: determining the SUPI of the UE, based on the information; and querying the UDR for the UE policy corresponding to the SUPI.

Embodiment 65: The apparatus of Embodiment 64, wherein the memory and the processor are configured to receive the information by receiving a subscription concealed identifier (SUCI) of the UE.

Embodiment 66: The apparatus of any of Embodiments 58-65, wherein the memory and the processor are configured to receive the UE policy by receiving at least one of a UE route selection protocol (URSP), an access network discovery and selection protocol (ANDSP), or a set of access network discovery and selection function (ANDSF) rules for an evolved packet system (EPS).

Embodiment 67: The apparatus of any of Embodiments 58-66, wherein the memory and the processor are configured to receive the request via a packet data network (PDN) connection through a serving gateway (SGW) and a session management function plus packet gateway for control information (SMF+PGW-C).

Embodiment 68: The apparatus of any of Embodiments 58-67, wherein the memory and the processor are configured to receive the request from the MME via an access management and mobility function (AMF), and the memory and the processor are configured to transmit the UE policy via the AMF.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a memory comprising executable instructions; and
    one or more processors configured to execute the executable instructions and cause the apparatus to:
        receive, from a user equipment (UE), a request for a UE policy that is to be obtained from a policy control function (PCF), the request including a UE policy container;
        obtain the UE policy from the PCF, wherein in order to obtain the UE policy from the PCF, the one or more processors are further configured to cause the apparatus to:
            forward the UE policy container to an access management and mobility function (AMF); and
            receive the UE policy container with the UE policy from the AMF; and
        transmit the UE policy to the UE, wherein in order to transmit the UE policy to the UE, the one or more processors are configured to cause the apparatus to forward the UE policy container with the UE policy to the UE via downlink (DL) non-access stratum (NAS) transport message.

2. The apparatus of claim 1, wherein the one or more processors are configured to receive the request via a non-access stratum (NAS) message containing a UE Policy Container for a $5^{th}$ generation (5G) network.

3. The apparatus of claim 2, wherein the UE Policy Container is configured to support evolved packet system (EPS) rules.

4. The apparatus of claim 3, wherein the one or more processors are further configured to:
    determine the PCF that supports provisioning the UE policy.

5. The apparatus of claim 4, wherein in order to obtain the UE policy, the one or more processors are further configured to:
    obtain an address for the PCF from a network function (NF) repository function (NRF); and
    request the UE policy from the PCF at the address using an Access and Mobility Policy Control Service (Npcf).

6. The apparatus of claim 1, wherein the one or more processors are configured to obtain the UE policy via a direct interface to the PCF.

7. The apparatus of claim 1, wherein the one or more processors are configured to obtain, from the request, information from which a subscription permanent identifier (SUFI) of the UE can be derived.

8. The apparatus of claim 1, wherein the one or more processors are configured to obtain the UE policy via at least one of a UE route selection protocol (URSP), an access network discovery and selection protocol (ANDSP), or a set of access network discovery and selection function (ANDSF) rules for an evolved packet system (EPS).

9. The apparatus of claim 1, wherein the one or more processors are configured to obtain the UE policy via a packet data network (PDN) connection to the PCF through a serving gateway (SGW) and a session management function plus packet gateway for control information (SMF+PGW-C).

10. The apparatus of claim 1, wherein in order to receive the request, the one or more processors are configured to receive a UE policy container in a policy configuration option (PCO) in a packet data network (PDN) connection establishment or modification request.

11. The apparatus of claim 1, wherein in order to receive the request, the one or more processors are configured to receive a UE policy container in an evolved packet system (EPS) attachment request.

12. An apparatus for wireless communications, comprising:
    a memory comprising executable instructions; and
    one or more processors configured to execute the executable instructions and cause the apparatus to:
        receive, from a user equipment (UE), a request for a UE policy from a policy control function (PCF);
        obtain the UE policy from the PCF, wherein in order to obtain the UE policy from the PCF, the one or more processors are configured to request the UE policy from the PCF via an interworking function (IWF); and
        transmit the UE policy to the UE.

13. An apparatus for wireless communications, comprising:
    a memory comprising executable instructions; and
    one or more processors configured to execute the executable instructions and cause the apparatus to:
        transmit, to a mobility management entity (MME), a request for a user equipment (UE) policy from a policy control function (PCF); and
        receive the UE policy from the MME by receiving a UE policy container with the UE policy via a downlink (DL) non-access stratum (NAS) transport message, wherein the UE policy is obtained from the PCF when the UE policy container is forwarded to an access management and mobility function (AMF) and when the UE policy container is updated with the UE policy from the AMF.

14. The apparatus of claim 13, wherein the one or more processors are configured to transmit the request via a non-access stratum (NAS) message containing a UE Policy Container for a $5^{th}$ generation (5G) network that is configured to support evolved packet system (EPS) rules.

15. The apparatus of claim 13, wherein in order to transmit the request, the one or more processors are configured to transmit a subscription permanent identifier (SUPI) of the apparatus.

16. The apparatus of claim 13, wherein in order to transmit the request, the one or more processors are configured to transmit information from which a subscription permanent identifier (SUPI) of the apparatus can be derived.

17. The apparatus of claim 16, wherein in order to transmit the information, the one or more processors are configured to transmit a subscription concealed identifier (SUCI) of the apparatus.

18. The apparatus of claim 13, wherein in order to transmit the request, the one or more processors are configured to transmit a request for at least one of a UE route selection protocol (URSP), an access network discovery and selection protocol (ANDSP), or a set of access network discovery and selection function (ANDSF) rules for an evolved packet system (EPS).

19. The apparatus of claim 13, wherein in order to transmit the request, the one or more processors are configured to transmit a UE policy container in a policy configuration option in a packet data network (PDN) connection establishment request.

20. The apparatus of claim 13, wherein in order to transmit the request, the one or more processors are configured to transmit a UE policy container in an evolved packet system (EPS) attachment request.

21. An apparatus for wireless communications by a policy control function (PCF), comprising:
a memory comprising executable instructions; and
one or more processors configured to execute the executable instructions and cause the apparatus to:
receive, from a mobility management entity (MME), a request for a user equipment (UE) policy for a UE via an access management and mobility function (AMF), and the memory and the one or more processors are configured to transmit the UE policy via the AMF;
obtain the UE policy from a unified data repository (UDR); and
transmit the UE policy to the MME.

22. The apparatus of claim 21, wherein the one or more processors are configured to receive via a non-access stratum (NAS) message containing a UE Policy Container for a $5^{th}$ generation (5G) network that is configured to support evolved packet system (EPS) rules.

23. The apparatus of claim 21, wherein the one or more processors are configured to receive the request via a direct interface from the MME.

24. The apparatus of claim 21, wherein the one or more processors are configured to receive the request via an Access and Mobility Policy Control Service (Npcf).

25. The apparatus of claim 21, wherein the one or more processors are configured to receive the request via an interworking function (IWF).

26. The apparatus of claim 21, wherein in order to receive the request, the one or more processors are configured to receive information from which a subscription permanent identifier (SUPI) of the UE can be derived, and in order to obtain the UE policy, the one or more processors are configured to:
determine the SUPI of the UE, based on the information; and
query the UDR for the UE policy corresponding to the SUPI.

27. The apparatus of claim 21, wherein the one or more processors are configured to obtain the UE policy via at least one of a UE route selection protocol (URSP), an access network discovery and selection protocol (ANDSP), or a set of access network discovery and selection function (ANDSF) rules for an evolved packet system (EPS).

28. The apparatus of claim 21, wherein the one or more processors are configured to receive the request via a packet data network (PDN) connection through a serving gateway (SGW) and a session management function plus packet gateway for control information (SMF+PGW-C).

* * * * *